United States Patent
Schmidt et al.

(10) Patent No.: US 10,100,848 B2
(45) Date of Patent: Oct. 16, 2018

(54) HYDRAULIC ACTUATOR AND METHOD OF PRODUCING THE SAME

(71) Applicant: SAFRAN LANDING SYSTEMS UK LTD, Gloucester (GB)

(72) Inventors: Robert Kyle Schmidt, Gloucester (GB); Matthew Hilliard, Gloucester (GB)

(73) Assignee: SAFRAN LANDING SYSTEMS UK LTD, Gloucestershire (GB)

( * ) Notice: Subject to any disclaimer, the term of this patent is extended or adjusted under 35 U.S.C. 154(b) by 245 days.

(21) Appl. No.: 15/098,480

(22) Filed: Apr. 14, 2016

(65) Prior Publication Data

US 2016/0305456 A1    Oct. 20, 2016

(30) Foreign Application Priority Data

Apr. 16, 2015 (EP) ..................... 15163803

(51) Int. Cl.
  *F15B 11/08* (2006.01)
  *B64C 25/22* (2006.01)
  *F15B 15/14* (2006.01)
  *F15B 11/12* (2006.01)

(52) U.S. Cl.
  CPC ............. *F15B 11/08* (2013.01); *B64C 25/22* (2013.01); *F15B 15/1409* (2013.01); *F15B 15/1447* (2013.01); *F15B 11/123* (2013.01)

(58) Field of Classification Search
  CPC .. F15B 11/08; F15B 15/1447; F15B 15/1409; F15B 11/123; F15B 15/1457; F16J 1/005
  See application file for complete search history.

(56) References Cited

U.S. PATENT DOCUMENTS

| | | | | |
|---|---|---|---|---|
| 2,661,721 A | * | 12/1953 | Sherwen | F15B 15/1447 277/565 |
| 3,165,032 A | * | 1/1965 | Konkle | F16J 1/006 277/434 |
| 3,654,839 A | * | 4/1972 | Thompson | F16J 1/12 92/200 |
| 4,180,274 A | * | 12/1979 | Tucek | F15B 15/1438 277/500 |
| 4,777,869 A | | 10/1988 | Dirkin | |
| 6,308,916 B1 | * | 10/2001 | Hrusch | B64C 25/22 244/102 R |
| 2005/0271481 A1 | | 12/2005 | Zins | |

FOREIGN PATENT DOCUMENTS

| | | |
|---|---|---|
| DE | 3416463 | 11/1985 |
| DE | 4041992 | 7/1992 |
| DE | 9415543 | 12/1994 |
| DE | 19843253 | 3/2000 |

(Continued)

OTHER PUBLICATIONS

Extended European Search Report dated Oct. 26, 2015 for European Application No. 15163803.8, 7 pages.

*Primary Examiner* — Thomas E Lazo
(74) *Attorney, Agent, or Firm* — RatnerPrestia

(57) ABSTRACT

A hydraulic actuator having a body defining a chamber, a piston rod including an annular groove and a piston head slidably housed within the chamber, the piston head having a number of segments each of which has a base portion mounted within the annular groove.

18 Claims, 7 Drawing Sheets

(56) References Cited

FOREIGN PATENT DOCUMENTS

| | | | |
|---|---|---|---|
| DE | 2510208 | 7/2014 | |
| DE | 202013005355 | 9/2014 | |
| EP | 1506921 | 2/2005 | |
| GB | 924429 | 4/1963 | |
| GB | 2093948 | 9/1982 | |
| GB | 2093948 A * | 9/1982 | ................ F16J 1/12 |
| WO | 2013029583 | 3/2013 | |

* cited by examiner

HYDRAULIC ACTUATOR AND METHOD OF PRODUCING THE SAME

This application claims the benefit of and priority to European Application 15163803.8, filed Apr. 16, 2015, the contents of which are incorporated herein by reference.

BACKGROUND

Hydraulic actuators are used in a range of industries to control the position of a first part relative to a second part.

It is common for a hydraulic actuator to include a casing which defines a chamber having a gland at one end. A piston mounted at one end of a rod is slidably housed within the chamber, with the rod extending through the gland in the casing. Hydraulic fluid can be pumped into or out of the chamber on one side of the piston to drive the piston, thereby causing the actuator to extend or retract.

A centre seeking actuator is a known type of actuator which also includes a floating piston mounted within the chamber, the rod piston being slidably mounted within the floating piston and the rod extending through glands in both the floating piston and the casing. The floating piston divides the chamber into a control side arranged to receive hydraulic fluid and a side vented to atmosphere. Hydraulic fluid pumped into the control side moves the floating piston to reduce the size of the vented side. The hydraulic fluid also passes through control apertures in the piston or floating piston to enter the floating piston chamber and move the rod piston away from the vented side such that the actuator assumes an intermediate extension state which lies between fully extended and retracted states of the actuator.

The present inventors have identified that known hydraulic actuators can be improved in terms of their reliability and lifespan.

SUMMARY

According to a first aspect of the invention, there is provided a hydraulic actuator comprising:
a body defining a chamber;
a piston rod including an annular groove;
a piston head slidably housed within the chamber, the piston head comprising a plurality of segments each of which has a base portion mounted within the annular groove.

Known hydraulic actuators are designed with certain parts connected via threaded unions to enable a piston to be fitted into a chamber. For example, the axial piston face of a floating piston is provided with a threaded portion arranged to be wound into engagement with a corresponding threaded portion on the generally cylindrical body to create a threaded union. It is also common for the piston to be screwed into engagement with the piston rod via a similar threaded union. The present inventors have identified that such threaded union portions can define regions of weakness for an actuator in terms of fatigue resistance. Also, it is generally a requirement for a further mechanical fixing to be provided to lock the screw threads against relative rotation. Such mechanical fixings can adversely affect the fatigue resistance of the actuator. A hydraulic actuator in accordance with the first aspect includes a piston configured to be assembled around a piston rod in situ within a chamber. The piston is formed from a plurality of piston segments. This enables the casing and/or floating piston to be of unitary construction, rather than being coupled by the threaded unions referred to above, which can improve fatigue resistance.

The assembled piston can include more than six segments, and in some cases eight or more segments, enabling a small insertion port to be provided.

The base portions of the segments can be arcuate to conform to a circumferential profile of the base of the groove in the piston rod.

A plurality, and in some cases all, of the segments can each include a pair of sidewalls, each of which is adjacent to a sidewall of an adjacent segment, and an arcuate top surface.

The top surface of each segment can include a channel extending from one side wall to the other side wall.

The segments can be locked together by a generally annular support ring disposed at least partially within the channel of each segment.

The support ring can be formed from a material which is softer than the segments; for example, a plastics material. This can reduce wear.

The support ring can include a sealing element arranged in sliding contact with the inner surface of the chamber. Thus, the piston can be used in an actuator arranged to be extended and/or retracted by relatively high fluid pressure acting on one side of the piston, such as a single or double acting actuator.

One or more of the segments can include a through hole configured to define at least part of a control port for passage of hydraulic fluid. In some cases the through hole(s) can be defined by gaps between adjacent segment side walls.

The body can comprise a floating piston slidably housed within a second chamber.

The body can be unitary.

In accordance with a second aspect of the present invention, there is provided an aircraft landing gear assembly comprising an actuator according to the first aspect.

In accordance with a third aspect of the present invention, there is provided an aircraft including one or more actuators according to the first aspect or one or more aircraft landing gear assemblies according to the second aspect.

In accordance with a fourth aspect of the present invention, there is provided a method of constructing a hydraulic actuator, the method comprising:
providing a body defining a chamber, the body including a segment insertion port;
providing a rod with an annular groove within the chamber;
inserting a segment through the insertion port such that a base of the segment enters the annular groove; and
inserting one or more further segments through the port such that a base of each further segment enters the annular groove to form a piston.

The method can further comprise providing a collar within the chamber and moving the completed piston into the collar to radially enlarge the collar to fix the collar around the top surfaces of the plurality of segments.

The method can further comprise fixing a cover, optionally in a fluid tight manner, over the segment insertion port, or otherwise closing or sealing the segment insertion port.

The method can further comprise fitting the actuator into an aircraft landing gear assembly or an aircraft.

BRIEF DESCRIPTION OF THE DRAWINGS

Embodiments of the invention will now be described with reference to the accompanying drawings, in which.

DETAILED DESCRIPTION

Figure 1:
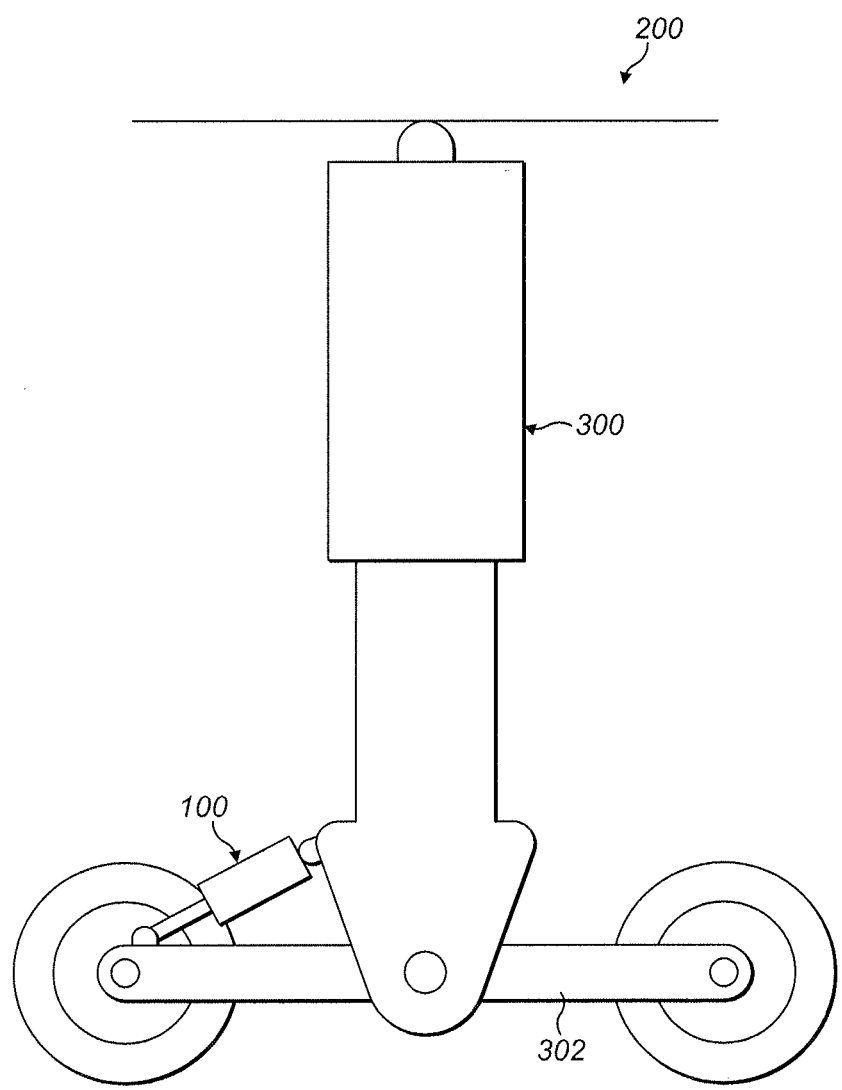
FIG. 1 is a schematic diagram of an aircraft landing gear assembly.

FIG. 1 is a diagram of part of an aircraft 200. More specifically, FIG. 1 shows an aircraft landing gear assembly 300 including a hydraulic actuator 100 serving as a 'pitch trimmer' to control the orientation of the bogie beam 302.

Figure 2:
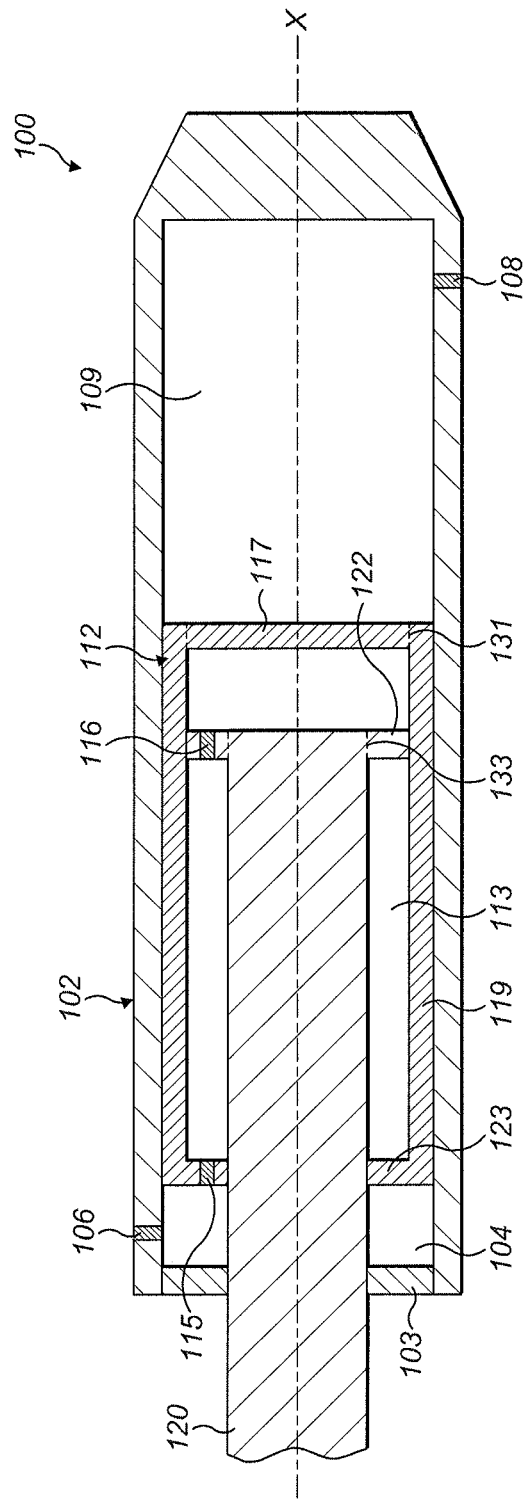
FIG. 2 is a schematic cross section diagram of a known hydraulic actuator.

FIG. 2 is a schematic longitudinal cross section view of a known centre seeking actuator 100. When operated the actuator 100 moves to assume an intermediate condition, but is not arranged to be actuated to the compressed or extended conditions.

The actuator 100 includes a casing 102 defining an inner volume that is generally partitioned by a floating piston 112 into a gas chamber 109 and a hydraulic fluid chamber 104. The gas chamber 109 is vented to atmosphere via a gas port 108.

The floating piston 112 is slidably housed within the inner volume to move along an axis X. The casing 102 includes a hydraulic fluid port 106 on the opposite side of the floating piston 112 to the gas port 108. The hydraulic fluid port 106 is arranged to be coupled to a hydraulic fluid circuit.

The floating piston 112 defines a floating piston chamber 113 within which a piston 122 of a piston rod 120 is slidably housed to move along the axis X. The piston rod 120 extends from the piston 122 through an aperture in an axial face 123 of the floating piston 112 and through an aperture in an axial face 103 of the casing 102, so as to project from the casing 102.

The floating piston 112 includes one or more control apertures 115 arranged to enable fluid communication between the hydraulic fluid chamber 104 and the floating piston chamber 113.

In use, pressurised hydraulic fluid enters the hydraulic fluid port 106 and forces the floating piston 112 to an end stop (not shown) adjacent to the gas port 108, as well as passing through the control apertures 115 into the floating piston chamber 113 and through a second set of one or more control apertures 116 beyond the piston 122 to act on its major surface to force the piston rod 120 to extend outwardly with respect to the casing 102. Thus, the actuator 100 is continually biased to an intermediate condition between and distinct from the fully extended condition and the fully compressed condition.

Known hydraulic actuators are designed with certain parts connected via threaded unions to enable a piston to be fitted into a chamber. For example, the axial piston face 117 of the floating piston 112 is provided with a threaded portion arranged to be wound into engagement with a corresponding threaded portion on the generally cylindrical body 119 to create a threaded union 131. It is also common for the piston 112 to be screwed into engagement with the piston rod 120 via a similar threaded union 133.

The present inventors have identified that the threaded unions 131, 133 can define regions of weakness for the actuator 100 in terms of fatigue resistance. Also, it is generally a requirement for a further mechanical fixing to be provided to lock the screw threads against relative rotation. Such mechanical fixings can adversely affect the fatigue resistance of the actuator.

As a general overview, embodiments of the invention relate to a hydraulic actuator in which a piston is configured to be assembled around a piston rod in situ within a chamber. The piston is formed from a plurality of piston segments. This enables the casing and/or floating piston to be of unitary construction, rather than being coupled by the threaded unions referred to above, which can improve fatigue resistance.

Figure 3:
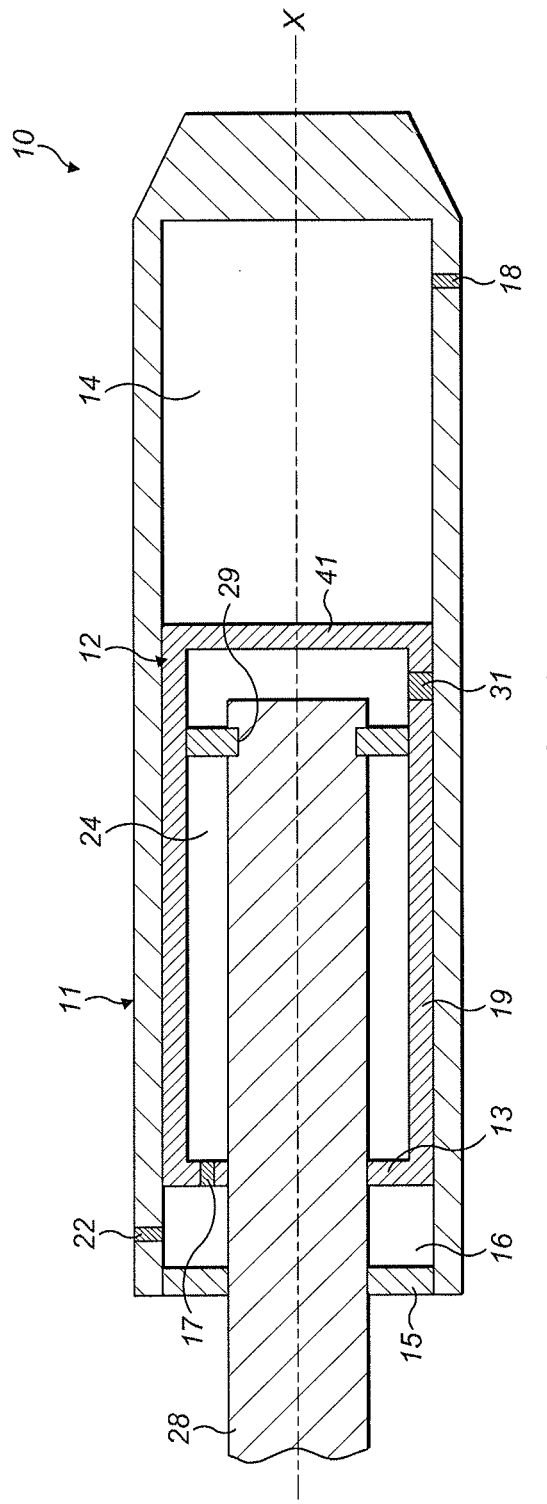
FIG. 3 is a schematic longitudinal cross section diagram of a hydraulic actuator according to an embodiment of the invention.

FIG. 3 is a schematic longitudinal cross section view of an actuator 10 according to an embodiment of the invention. The actuator 10 is similar to the known actuator 100 and therefore, for brevity, the following description will focus on the differences between the actuator 10 and the known actuator 100.

The actuator 10 includes a casing 11 defining an inner volume that is generally partitioned by a floating piston 12 into a gas chamber 14 and a hydraulic fluid chamber 16. The gas chamber 14 is vented to atmosphere via a gas port 18.

The floating piston 12 is slidably housed within the inner volume to move along an axis X. The casing 11 includes a hydraulic fluid port 22 on the opposite side of the floating piston 12 to the gas port 18. The hydraulic fluid port 22 is arranged to be coupled to a conventional hydraulic fluid circuit (not shown). The hydraulic fluid circuit supplies pressured hydraulic fluid via, for example, a piloted check valve to limit the applied fluid pressure and includes a poppet valve or the like to enable hydraulic fluid to exit the actuator into the return line.

The floating piston 12 includes a piston head 41 which may be acted upon by the hydraulic fluid to force the floating piston 12 to move towards the gas port 18.

The floating piston 12 defines a floating piston chamber 24 within which a piston head 26 of a piston rod 28 is slidably housed to move along the axis X. The piston rod 28 extends from the piston head 26 through a gland in an axial face 13 of the floating piston 12 and through a gland in an axial face 15 of the casing 11, so as to project from the casing 11.

The floating piston 12 includes control apertures 17 arranged to enable fluid communication between the hydraulic fluid chamber 16 and the floating piston chamber 24.

Figure 4:
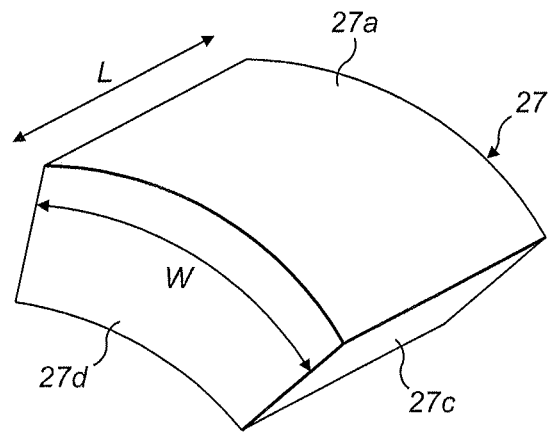
FIG. 4 is a schematic diagram of a piston segment.
Figure 5:
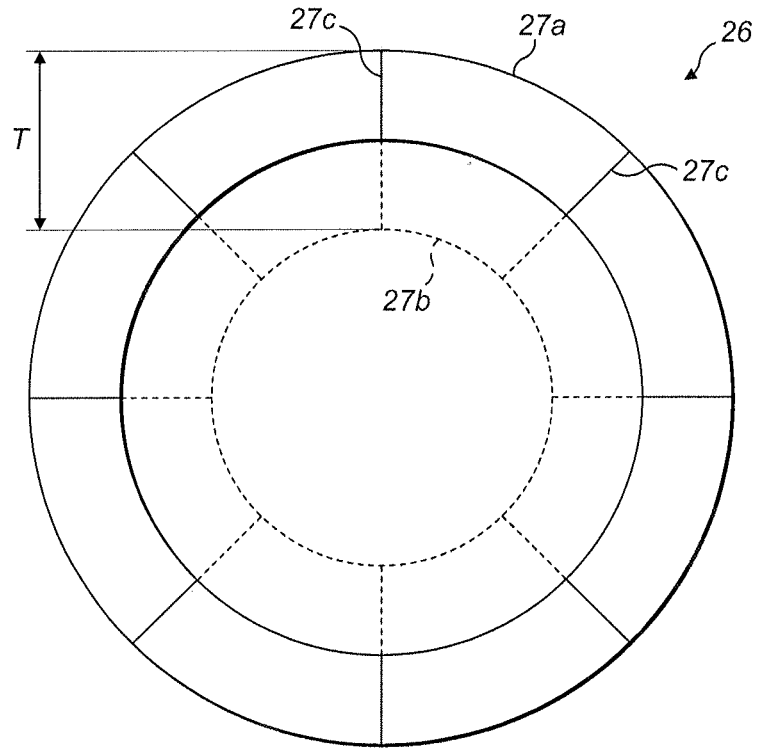
FIG. 5 is a schematic diagram illustrating a completed piston.

Referring additionally to FIGS. 4 and 5, a segment 27 has an arcuate outer face 27a which defines part of a contiguous circumferential piston surface of the assembled piston 26. A base 27b extends in a parallel offset with respect to the outer face 27a. The offset defines a segment thickness T. Radially extending side faces 27c connect the upper face 27a and base 27b. Each segment 27 has a width W corresponding to the length of the arc defined by the outer face. The distance between axial faces 27d of a segment 27 represents the length L of the segment 27.

Figure 6B:
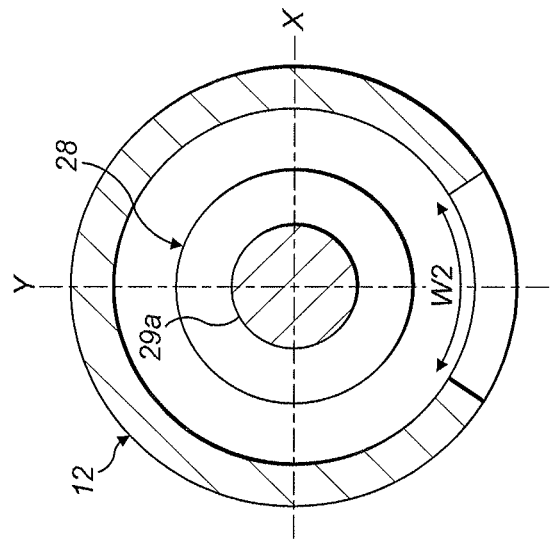
FIG. 6b is a schematic lateral cross section diagram of part of the actuator of FIG. 3 prior to installation of the piston segments.
Figure 6A:
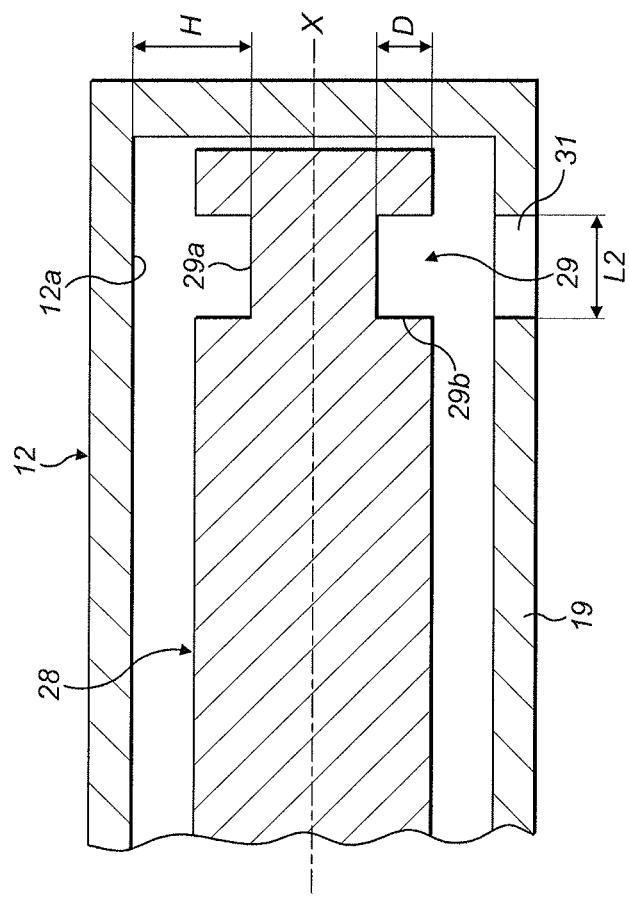
FIG. 6a is a schematic longitudinal cross section diagram of part of the actuator of FIG. 3 prior to installation of the piston segments.
Figure 7:
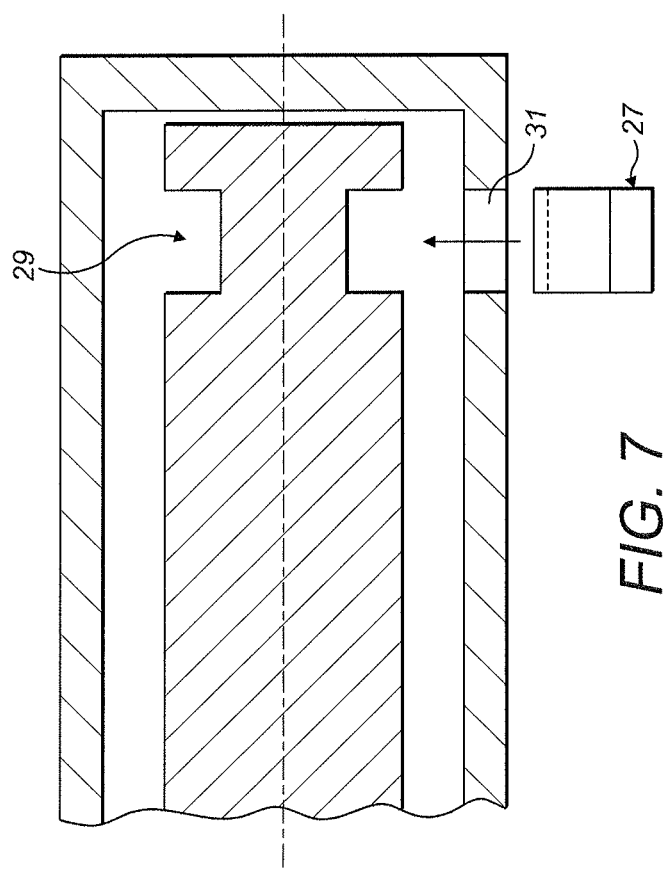
FIG. 7 is a schematic diagram illustrating a segment being inserted into the segment insertion port.

Referring additionally to FIGS. 6a to 7, the piston segments 27 are sized for insertion through a port 31 in the generally cylindrical side wall 19 of the floating piston 12.

The piston rod 28 includes a generally annular groove 29 which is coaxial with the axis X. The circumferential surface 29a at the base of the groove 29 has a diameter which is slightly less than the diameter of a contiguous base surface defined by the segments 27 of a piston assembly. Thus, the segments 27 of a piston assembly can be built up around the piston rod, within the groove 29.

The thickness T of each segment is slightly less than that of the annulus defined by the radial distance H between the circumferential surface 29a at the base of the groove 29 and the inner face 12a of the actuator casing or floating piston which defines the chamber 12. The depth D of the groove 29 defined by the dimension of the groove sidewalls 29b is less than the radial distance H.

The port 31 has a length L2 which is greater than the segment length L. The port 31 has a width W2 corresponding to the length of the arc defined between the inner chamber face 12a either side of the port 31. The port width W2 can be greater than the segment width W, allowing a segment 27 to be radially moved through the port 31 into the groove 29.

Figure 8:
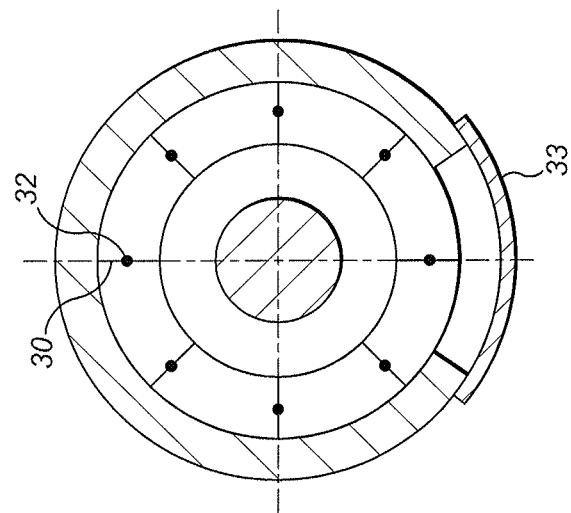
FIG. 8 is a schematic diagram illustrating a completed piston within the actuator body chamber.

In some embodiments the port with W2 can be slightly smaller than the segment with W, in which case a segment 27 can be introduced into the groove 29 side-on through the port 31 in a generally tangential manner until a sufficient portion of the segment 27 is within the annulus to allow the tail end of the segment 27 to pass through the port 31 so that the base 27b of the segment 27 is adjacent to the circumferential surface 29a at the base of the groove 29. The segment 27 can then be moved circumferentially around the annulus. Further segments 27 are introduced in the same fashion until the piston assembly 26 has been formed, as illustrated in FIG. 8. Advantageously, a relatively large segment width W in comparison to the port width W2 can reduce the likelihood of a segment 27 falling out of the port 31 should the actuator assume an extension state corresponding to the piston assembly 26 being aligned with the port 31. However, the port 31 can be positioned at a location corresponding to an extension state which the actuator can attain, but which it does not do so in normal operation; for example, it may be prevented from doing so by movement constraints of the parts to which the actuator is connected. Also, the port can be covered by a cover 33 following assembly to prevent segments 27 moving back through the port 31. The cover 33 can define a fluid tight seal, which may be desirable if the actuator is a double acting actuator in which the segments 27 are provided with seals to define a substantially fluid tight sealed piston 26.

Figure 9:
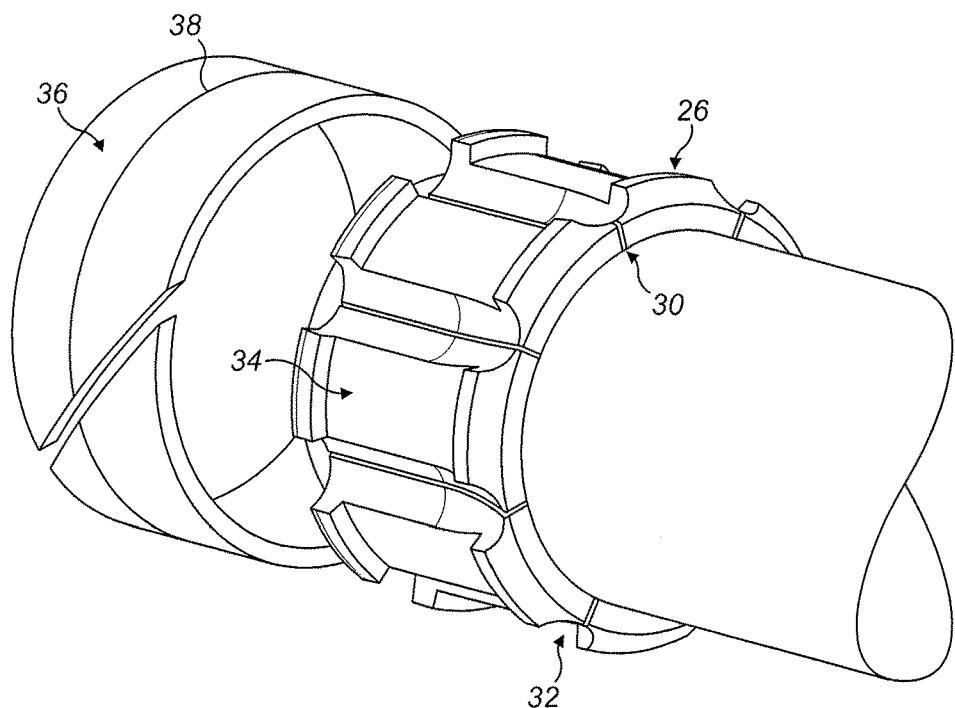
FIG. 9 is a diagram illustrating part of a hydraulic actuator according to an embodiment of the invention in which the piston segments include channels, and a retaining ring is provided to hold the segments together following assembly.

Referring additionally to FIG. 9, in cases where there is no requirement for the piston 26 to divide the chamber in a sealed manner, gaps 30 can exist between the segments, in some cases in the form of recessed control ports 32, to permit the passage of hydraulic fluid.

In any embodiment, the top surface 27a of each segment 27 can include a circumferential channel 34 extending from one side wall to the other side wall. The segments can be locked together by a generally annular support ring 36 disposed at least partially within the channel 34 of each segment. Axial movement of the support 36 ring can be constrained by small protrusions (not shown) which extend inwardly from the chamber wall at a location spaced from the back wall by an amount which is less than or equal to the thickness of the support ring 36. As such, the protrusions retrain the support ring 36 as the piston 26 assembly is forced into it. Leading edges of the segments can be ramped to guide the ring 36 around them. The ring 36 can then snap fit into the channel 34 and remains there due to the side walls of the channel 34.

In cases where a seal is required, segment faces other than the axial faces can be provided with sealing elements which deform when pressed against adjacent segments to create a seal between them. Where a support ring 36 is provided, the support ring 36 can include a sealing element 38 around its circumference arranged for sliding contact with the inner surface of the chamber.

Figure 10:
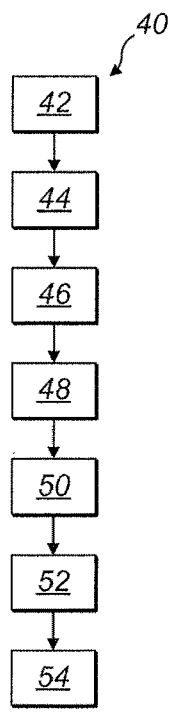
FIG. 10 is a flow diagram of a method of constructing a hydraulic actuator according to an embodiment of the invention.

FIG. 10 illustrates a method 40 of constructing a hydraulic actuator according to an embodiment of the invention.

At step 42 the method comprises providing a body defining a chamber, the body including a segment insertion port and a piston rod insertion gland. The chamber can be of unitary construction.

At step 44 the method comprises providing a rod with an annular groove through the gland to position the annular groove within the chamber in alignment with the segment insertion port.

At step 46 the method comprises inserting a segment through the insertion port such that a base of the segment enters the annular groove.

At step 48 the method comprises inserting one or more further segments through the port such that a base of each further segment enters the annular groove to form a piston assembly.

At step 50 the method optionally comprises providing a collar within the chamber and moving the completed piston into the collar to radially enlarge the collar to fix the collar around the top surfaces of the plurality of segments.

At step 52 the method optionally comprises fixing a cover, optionally in a fluid tight manner, over the segment insertion port, or otherwise closing or sealing the segment insertion port.

At step 54 the method optionally comprises fitting the actuator into an aircraft landing gear assembly or an aircraft.

An aircraft assembly according to embodiments of the present invention may be any assembly including a hydraulic actuator according to an embodiment of the invention; for example, an assembly comprising flaps or slats in an aircraft wing, or an aircraft landing gear assembly as illustrated in FIG. 1.

Although the invention has been described above with reference to one or more preferred embodiments, it will be appreciated that various changes or modifications may be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

We claim:
1. A hydraulic actuator comprising:
a body defining a chamber;
a piston rod including an annular groove;
a piston head slidably housed within the chamber, the piston head comprising a plurality of segments each of which has a base portion mounted within the annular groove;

wherein an insertion port is formed through a sidewall of the body, the insertion port being sized to receive at least one of the piston segments.

2. The hydraulic actuator according to claim 1, wherein the segments each include a pair of sidewalls, each of which is adjacent to a sidewall of an adjacent segment, and an arcuate top surface.

3. The hydraulic actuator according to claim 2, wherein the top surface of each segment includes a channel extending from one side wall to the other side wall.

4. The hydraulic actuator according to claim 3, wherein the segments are locked together by a generally annular support ring disposed at least partially within the channel of each segment.

5. The hydraulic actuator according to claim 4, wherein the support ring includes a sealing element arranged in sliding contact with the inner surface of the chamber.

6. The hydraulic actuator according to claim 1, wherein one of more of the segments includes a through hole or opening configured to define at least part of a control port for passage of hydraulic fluid.

7. The hydraulic actuator according to claim 1, wherein a plurality of the segments are provided with seals arranged to define a fluid tight seal with adjacent segments and optionally the annular groove and/or chamber wall when the piston is assembled.

8. The hydraulic actuator according to claim 1, wherein the body comprises a floating piston slidably housed within a second chamber.

9. The hydraulic actuator according to claim 1, wherein the body comprises a unitary construction.

10. The hydraulic actuator according to claim 1, wherein the insertion port comprises a cover that is configured to selectively close the insertion port.

11. An aircraft landing gear assembly comprising an actuator according to claim 1.

12. An aircraft including one or more actuators according to claim 1.

13. An aircraft including one or more aircraft landing gear according to claim 11.

14. A method of constructing a hydraulic actuator, the method comprising:
    providing a body defining a chamber, the body including a segment insertion port;
    providing a rod with an annular groove within the chamber;
    inserting a segment through the insertion port such that a base of the segment enters the annular groove; and
    inserting one or more further segments through the port such that a base of each further segment enters the annular groove to form a piston.

15. The method according to claim 14, further comprising providing a collar within the chamber and moving the completed piston into the collar to radially enlarge the collar to fix the collar around the top surfaces of the plurality of segments.

16. The method according to claim 14, further comprising fixing a cover, optionally in a fluid tight manner, over the segment insertion port, or otherwise closing or sealing the segment insertion port.

17. A method according to any of claim 14, further comprising fitting the actuator into an aircraft landing gear assembly or an aircraft.

18. A hydraulic actuator comprising:
    a body defining a chamber;
    a piston rod including an annular groove;
    a piston head slidably housed within the chamber, the piston head comprising a plurality of segments each of which has a base portion mounted within the annular groove; and
    wherein the body comprises a floating piston slidably housed within a second chamber.

* * * * *